June 28, 1966  N. L. CROOK  3,258,228
AIRCRAFT WITH COUPLED FLIGHT AND PAYLOAD UNITS
Filed May 4, 1964  3 Sheets-Sheet 1

INVENTOR.
NORMAN L. CROOK
BY
Knox & Knox

June 28, 1966 N. L. CROOK 3,258,228
AIRCRAFT WITH COUPLED FLIGHT AND PAYLOAD UNITS
Filed May 4, 1964 3 Sheets-Sheet 2

INVENTOR.
NORMAN L. CROOK
BY
Knox & Knox

LANDING DIRECTION

WIND DIRECTION

*INVENTOR.*
NORMAN L. CROOK
BY
Knox & Knox

United States Patent Office 3,258,228
Patented June 28, 1966

3,258,228
AIRCRAFT WITH COUPLED FLIGHT AND
PAYLOAD UNITS
Norman L. Crook, 2950 Clairemont Drive, Apt. 1,
San Diego, Calif.
Filed May 4, 1964, Ser. No. 364,516
8 Claims. (Cl. 244—46)

The present invention relates to aircraft and more specifically to an aircraft with coupled flight and payload units.

Conventional aircraft of the fixed wing type are usually designed for a particular performance and are limited by their design. Aircraft designed for short-take-off and landing (STOL) normally have a steep climbing angle, which may be undesirable with certain payloads, while maneuvering to land in restricted areas may require flight in extreme attitudes. In large aircraft power operated controls are needed to provide the forces sufficient to move the control surfaces. Cross wind landing is a problem with most aircraft, particularly light aircraft and can be dangerous. The simple two control aircraft, in which the rudder pedals are omitted and the rudder and ailerons are coupled, are especially difficult to land cross wind, yet the two control system is intended to simplify flying.

The primary object of this invention is to provide an aircraft having a flight unit with aerodynamic supporting and control surfaces and a payload unit pivotally suspended from and independently movable with respect to the flight unit.

Another object of this invention is to provide an aircraft in which the flight unit is of light structure and is easily controlled by a simple control system, since the inertia is low.

Another object of this invention is to provide an aircraft wherein the payload unit can be trimmed to a different attitude from that of the flight unit, to offset a steep climbing angle, or to assist in a cross wind landing by aligning the payload unit in the direction of motion while the flight unit is headed into the relative wind, to give but two examples.

Another object of this invention is to provide an aircraft which is adaptable to a variety of propulsion systems, either on the payload unit or the flight unit, depending on the particular use of the aircraft.

A further object of this invention is to provide an aircraft wherein the payload unit can be adapted to a variety of configurations and uses without changing the flight unit.

In the drawings.

Similar characters of reference indicate similar or identical elements and portions throughout the specification and throughout the views of the drawing.

BASIC AIRCRAFT

Figure 1:
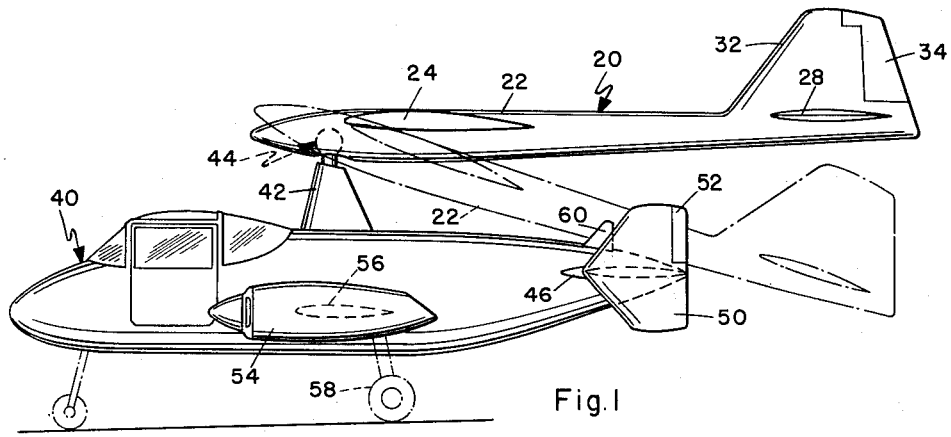
FIGURE 1 is a side elevation view of a typical aircraft.
Figure 2:
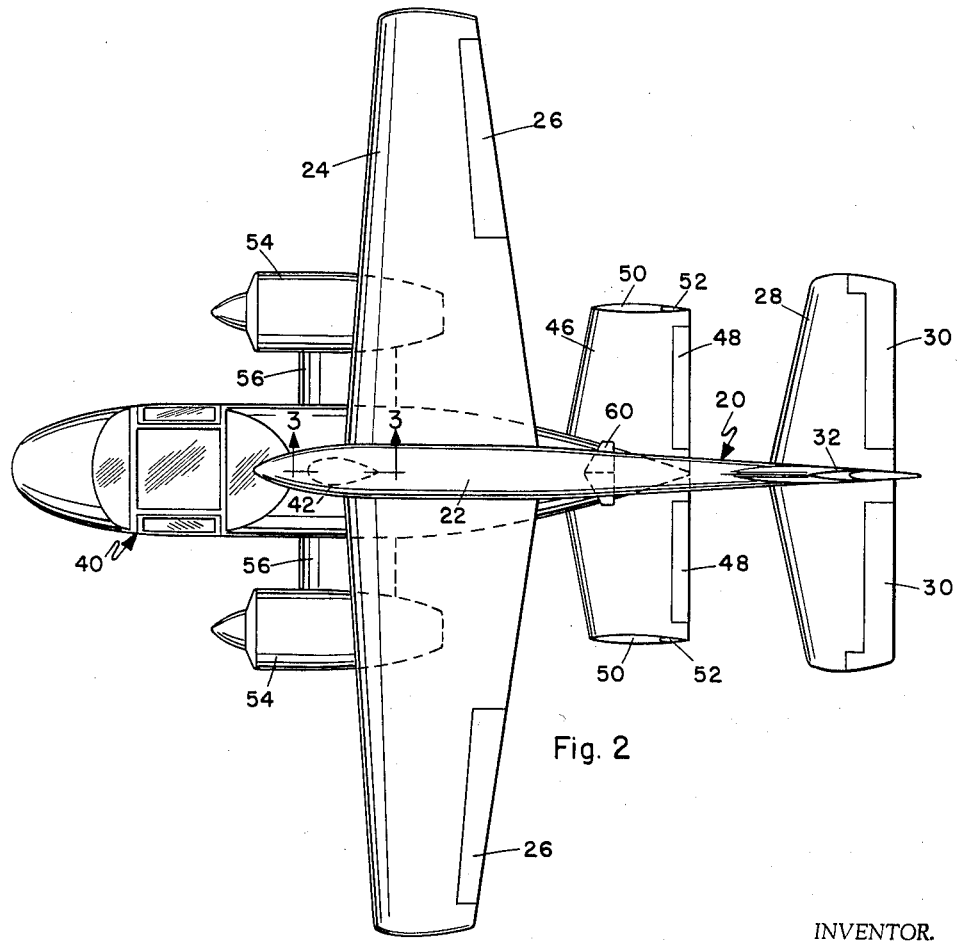
FIGURE 2 is a top plan view thereof.

The actual configuration of the aircraft can vary considerably, one particular design being illustrated in FIGURES 1 and 2 by way of an example.

The aircraft comprises a flight unit 20 having a boom 22 on which is mounted a wing 24 with ailerons 26, a tailplane 28 with elevators 30 and a fin 32 with a rudder 34. The arrangement is similar to a conventional aircraft except that the usual fuselage is reduced to a boom just large enough for rigid support and to contain control connections. Beneath the flight unit 20 is a payload unit 40 having an upright pylon 42 substantially at the center of gravity location. At the upper end of the pylon 42 is a pivotal coupling 44 connecting the payload unit 40 to the flight unit 20. The position of coupling 44 relative to wing 24 will vary according to the overall aerodynamic characteristics of the aircraft and is illustrated in this example as slightly forward of the wing. Payload unit 40 can be designed to carry passengers or cargo and is provided with a rear mounted horizontal stabilizer 46 with small pitch trim surfaces 48, the tips of said stabilizer carrying vertical stabilizers 50 with yaw trim surfaces 52. A pair of power units 54 are mounted on laterally extending struts 56 on opposite sides of payload unit 40, the particular type, number and position of the power units being dependent on the aircraft and its required performance. Any suitable landing gear 58 may be used. Since flight unit 20 is freely pivoted, it will hang down to rest on the rear of payload unit 40 in static position, a concave guide 60 being provided to hold boom 22 for convenience.

Figure 3:
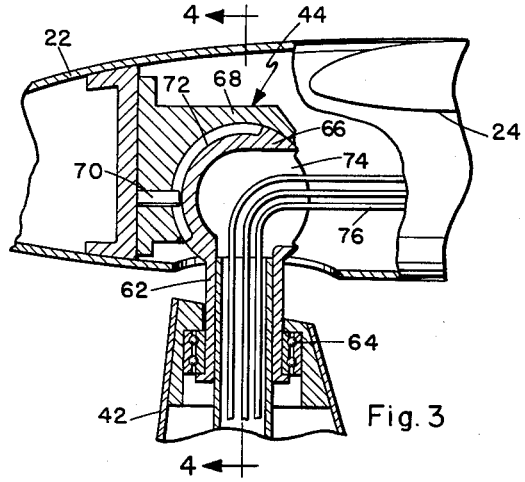
FIGURE 3 is an enlarged fragmentary sectional view taken on line 3—3 of FIGURE 2.
Figure 4:
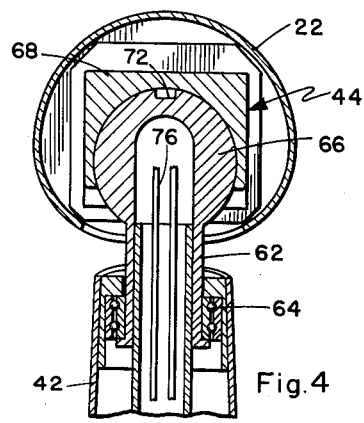
FIGURE 4 is a sectional view taken on line 4—4 of FIGURE 3.

The pivotal coupling 44 is illustrated in FIGURES 3 and 4, wherein an upright post 62 is journalled in a bearing 64 in pylon 42, the upper end of said post carrying a ball element 66. Inside boom 22 is a socket member 68 in which the ball element 66 is seated, said socket member having a pin 70 which rides in a vertically circumferential groove 72 in said ball element to prevent rotation of the socket member about the ball on a vertical axis. Pin 70 is radial to the center of ball element 66 so that the boom 22 is free to roll laterally on the ball, the groove 72 allowing for fore and aft or pitching motion of the boom. Bearing 64 provides for yawing motion of the boom 22. Thus the flight unit 20 has freedom of roll, pitch and yaw relative to payload unit 40. The rear portion of ball element 66 has an opening 74, the control connections, collectively indicated at 76, passing from payload unit 40, up through post 62 and through said opening to the various control surfaces in flight unit 20. The control connections 76 have sufficient flexibility, or can be provided with suitable linkage, to permit motion of the flight unit on the pivotal coupling. Other than the control connections 76 to the control surfaces, there is no direct connection between the two units which would feed back forces to the pilot, the flight unit being substantially free floating.

Figure 6:
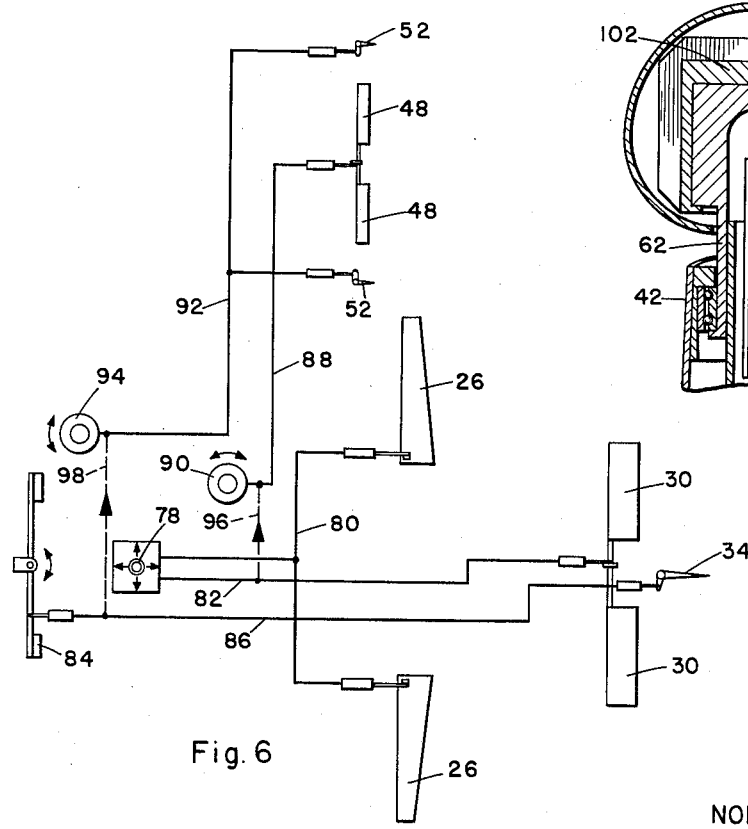
FIGURE 6 is a diagram of a suitable control system for the aircraft.

A suitable control system for the aircraft is illustrated in FIGURE 6, the controls and their operation being of conventional type. A pilot's control stick 78 is coupled by control connections 80 and 82 to the ailerons 26 and elevators 30, respectively. Rudder pedals 84 are coupled by a control connection 86 to rudder 34. These are basic aircraft controls and may be manually or power operated by any well known system.

The pitch trim surfaces 48 on payload unit 40 are operated through a control connection 88 from a pitch trim control 90. Similarly, yaw trim surfaces 52 are operated through control connection 92 from a yaw trim control 94. The controls 90 and 94 may be conventional type trim wheels or some suitable additional control. To coordinate control of the two units, the control connection 82 may be coupled to control connection 88 by an interconnection 96 so that elevators 30 and pitch trim surfaces 48 operate together. Also control connections 86 and 92 may be coupled by an interconnection 98, so that rudder 34 and yaw trim surfaces 52 operate together. The ratio of motion of the two sets of surfaces will depend on their relative areas, moment arms and the degree of coupling required. In each control the trim controls will override the interconnections and add to or subtract from the control motions as desired.

Figure 5:
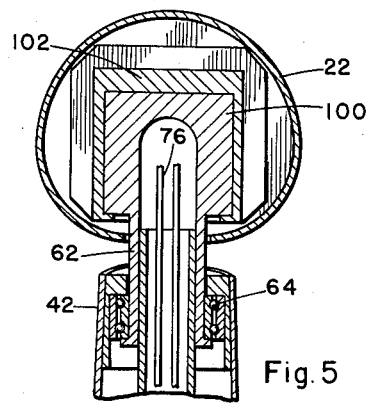
FIGURE 5 is a sectional view similar to FIGURE 4, showing an alternative pivotal connection.

An alternative form of the pivotal connection is illustrated in FIGURE 5. The post and bearing assembly are unchanged, but the ball element is changed to a cylindrical element 100 which is engaged in a socket member 102 in the boom 22. Thus the flight unit does not have freedom of roll and will move together with the payload unit under roll control, which will not be a disadvantage in large aircraft where turning is not particularly rapid. The freedom of pitch and yaw between the units is maintained, together with the primary advantages of the aircraft design. A longitudinal sectional view of FIGURE 5 would resemble FIGURE 3, except that the pin and groove would not be required.

MODIFIED AIRCRAFT CONFIGURATIONS

The basic form of the aircraft with the pivotal connection at the top of the pylon, or in the flight unit, is preferred for overall stability over a wide performance range. However, for specific purposes it may be desirable to have the pivot at a different location.

Figure 7:
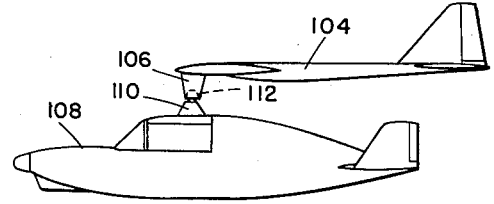
FIGURE 7 is a reduced side view of an aircraft with the pivotal connection of the two units mid-way between the units.

The aircraft illustrated in FIGURE 7 has a flight unit 104 with a downwardly extending plyon 106 and a payload unit 108 with an upright pylon 110, interconnected by a pivotal coupling 112 substantially mid-way between the units.

Figure 8:
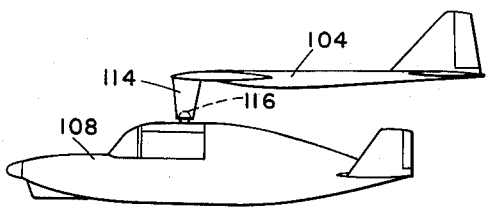
FIGURE 8 is a similar view with a lower pivot.

Another arrangement, illustrated in FIGURE 8, has a single pylon 11 extending below flight unit 104 with a pivotal coupling 116 at its lower end to payload unit 108.

Figure 9:
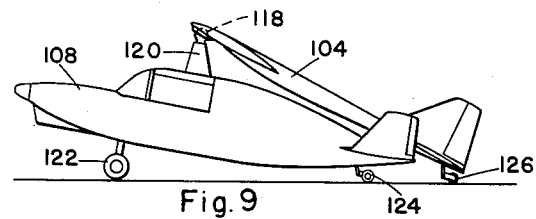
FIGURE 9 is a further similar view with an upper pivot and showing the static position of the aircraft.

The aircraft illustrated in FIGURE 9 has a pivotal coupling 118 at the top of a pylon 120, but is fitted with conventional forward main landing gear 122 and a tail wheel 124. In this instance the rear end of flight unit 104 rests on the ground and is provided with swivelling wheels or casters 126, so that the flight unit will follow the payload unit during taxying.

Figure 11:
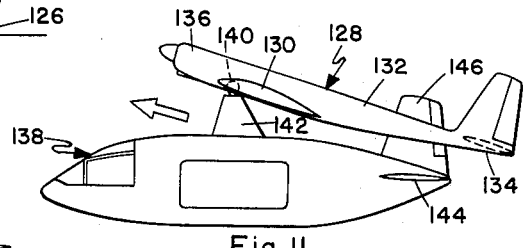
FIGURE 11 is a side elevation view of the aircraft of FIGURE 10, showing a steep climb attitude.
Figure 10:
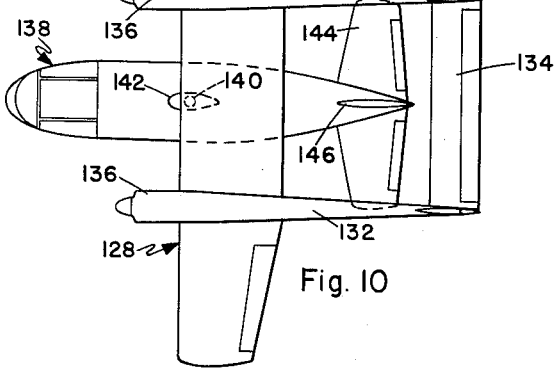
FIGURE 10 is a top plan view of an alternative aircraft configuration.

A configuration particularly suitable for large aircraft is illustrated in FIGURES 10 and 11. In this aircraft the flight unit 128 has a wing 130 and a pair of rearwardly extending booms 132 carrying the tail assembly 134. Power units 136 are mounted on the forward ends of booms 132 rather than on the payload unit 138, which is joined to wing 130 by a pivotal coupling 140 on pylon 142. The payload unit 138 has a tailplane 144 and a single central fin 146 to fit between booms 132 when the flight unit is lowered. While the mounting of the power units on the flight unit will increase its weight and inertia, it will still be less than that of a complete aircraft with payload and, in a large aircraft, power operated controls would be necessary in any event.

FLIGHT CHARACTERISTICS

In all configurations of the aircraft the basic characteristics are similar. On the ground, while taxying or moving at low speed during take-off and landing, the flight unit is lowered. When sufficient forward speed is attained for the aerodynamic lift to be effective, the flight unit rises to flying position and is operated by the pilot's controls in the manner of a conventional aircraft. Thus the pilot actually flies the flight unit and the payload unit is carried as a substantially independent element. With interconnection of control surfaces of the two units the payload unit will follow the attitude of the flight unit to an extent determined by the ratio of effectiveness of the two sets of controls. The flight unit can be subjected to a considerable range of control, such as a steep climb, a steep landing approach, and a sudden flare-out before touch down, without the necessity for putting the payload unit into any extreme attitudes. In fact the payload unit can be trimmed by means of its own trim surfaces to hold a comfortable attitude or a position desirable for maximum visibility during maneuvering of the flight unit.

For example, it can be seen in FIGURE 11 that the flight unit 128 can be disposed at a steep climbing angle, the thrust line of power units 136 being at that angle also for maximum efficiency, while the payload unit 138 is substantially level. This would be a distinct advantage when carrying special payloads which must be handled carefully, yet would allow the aircraft to be operated with short take-off and landing techniques.

Figure 12:
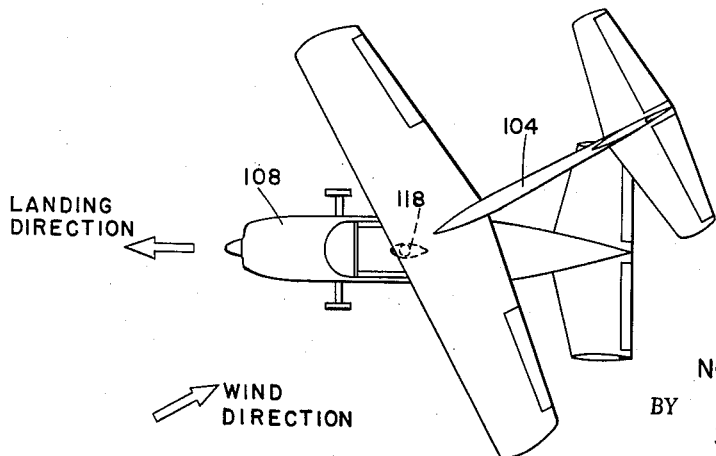
FIGURE 12 is a top plan view of an aircraft similar to that of FIGURE 7, 8, or 9, showing the cross wind landing attitude.

Another very useful characteristic, particularly for light aircraft, is the cross wind landing capability illustrated in FIGURE 12. The payload unit 108 is trimmed to head in the proper landing direction, along the runway, while the flight unit 104 can be held offset, heading into the relative wind as indicated by the directional arrows. Thus the aerodynamic efficiency of the flight unit is maintained while the wheels are oriented for proper touch down, in addition to giving the pilot correct orientation in the approach. Normally a cross wind landing is made by holding the entire aircraft into wind at an angle to the direction of motion until immediately prior to touch down, then applying a rapid yawing action to straighten the aircraft out for the landing roll, which requires considerable skill.

In turbulent conditions the payload unit is not subjected to much of the fluctuation of the flight unit and, since there are no direct inter-coupling loads between the two units, other than the small aerodynamic loads on the control surfaces of the flight unit, control action is light and does not become tiring. It will be evident that the pivotal coupling provides an ideal disconnection point for separating the payload unit from the flight unit, so that different payloads can be carried and the disconnected payload units handled as ground vehicles.

The configuration is also adaptable to model aircraft and tests have shown the aircraft to have good stability during take-off, in flight and in a glide approach to landing. The same characteristics are apparent with a variety of arrangements of lifting and stabilizing surfaces and it has been found that the center of gravity location is not particularly critical.

It is understood that minor variations from the form of the invention disclosed herein may be made without departure from the spirit and scope of the invention, and that the specification and drawings are to be considered as merely illustrative rather than limiting.

I claim:
1. An aircraft, comprising:
    a flight unit having fixed aerodynamic supporting surfaces with control surfaces thereon;
    a payload unit spaced from and dependent for aerodynamic support on said flight unit and having a coupling above the payload unit, freely pivotal on at least one axis relative to the flight unit; landing gear mounted on said payload unit;
    and propulsion means on at least one of said flight and payload units.
2. An aircraft according to claim 1 wherein said pivotal coupling is closely adjacent said flight unit.
3. An aircraft according to claim 1 wherein said pivotal coupling is intermediate said flight unit and said payload unit.

4. An aircraft according to claim 1 wherein said pivotal coupling is closely adjacent said payload unit.

5. An aircraft, comprising:
   a flight unit having fixed aerodynamic supporting surfaces operatively mounted thereon;
   a payload unit spaced below and dependent for aerodynamic support on said flight unit and having a pivotal coupling to the flight unit;
   said pivotal coupling being substantially freely pivotal on at least two orthogonal axes relative to said flight unit;
   aerodynamic trim surfaces operatively mounted on said payload unit;
   control means interconnecting said control surfaces and said trim surfaces; landing gear mounted on said payload unit;
   and propulsion means on at least one of said flight and payload units.

6. An aircraft according to claim 5 and including trim control means connected to said trim surfaces to operate independently of said control surfaces.

7. An aircraft according to claim 6 wherein said pivotal coupling is pivotal about the lateral pitch axis and the vertical, yaw axis of the aircraft.

8. An aircraft according to claim 7 wherein said pivotal coupling is further pivotal about the longitudinal, roll axis of the aircraft.

References Cited by the Examiner

UNITED STATES PATENTS

| | | | |
|---|---|---|---|
| 2,062,599 | 12/1936 | North | 244—2 |
| 2,681,776 | 6/1954 | Howard | 244—45 |
| 2,774,547 | 12/1956 | Latimer-Needham et al. | 244—3 |
| 2,822,994 | 2/1958 | Warto | 244—45 |
| 2,883,125 | 4/1959 | Jarvis et al. | 244—2 |
| 3,100,093 | 8/1963 | McQuillen et al. | 244—3 |

MILTON BUCHLER, *Primary Examiner.*

B. BELKIN, *Assistant Examiner.*